(12) United States Patent
Beck et al.

(10) Patent No.: US 11,607,764 B2
(45) Date of Patent: Mar. 21, 2023

(54) DEVICE FOR CREATING A CLAMPING

(71) Applicant: SAUTER FEINMECHANIK GMBH, Metzingen (DE)

(72) Inventors: Matthias Beck, Metzingen (DE); Kurt Birk, Reutlingen (DE); Manuel Keppeler, Pliezhausen (DE); Markus Ludwig, Kirchentellinsfurt (DE)

(73) Assignee: SAUTER FEINMECHANIK GMBH, Metzingen (DE)

( * ) Notice: Subject to any disclaimer, the term of this patent is extended or adjusted under 35 U.S.C. 154(b) by 101 days.

(21) Appl. No.: 17/265,260

(22) PCT Filed: Jul. 31, 2019

(86) PCT No.: PCT/EP2019/070651
§ 371 (c)(1),
(2) Date: Feb. 2, 2021

(87) PCT Pub. No.: WO2020/030500
PCT Pub. Date: Feb. 13, 2020

(65) Prior Publication Data
US 2021/0299811 A1  Sep. 30, 2021

(30) Foreign Application Priority Data
Aug. 10, 2018 (DE) .......... 10 2018 006 304.7

(51) Int. Cl.
*B23Q 16/10* (2006.01)
(52) U.S. Cl.
CPC ...... *B23Q 16/105* (2013.01); *B23Q 2220/004* (2013.01)

(58) Field of Classification Search
CPC .......... B23Q 16/105; B23Q 16/10; B23Q 2220/004; B23Q 16/102; B23Q 16/107
See application file for complete search history.

(56) References Cited

U.S. PATENT DOCUMENTS 7,798,293 B2 * 9/2010 Yoshida ............... B23Q 16/102
188/73.1
2007/0284798 A1  12/2007 Yoshida

FOREIGN PATENT DOCUMENTS

CN  105904282 A  * 8/2016 .......... B23Q 16/105
DE  1 115 997  10/1961
(Continued)

OTHER PUBLICATIONS

International Search Report (ISR) dated Nov. 7, 2019 in International (PCT) Application No. PCT/EP2019/070651.

*Primary Examiner* — Thomas C Diaz
(74) *Attorney, Agent, or Firm* — Wenderoth, Lind & Ponack, L.L.P.

(57) ABSTRACT

A device creates a clamping between clamping surfaces (24, 26) facing each other and forming a frictional engagement between each other, on a stationary body (2) and a body (4) that can be moved relative the stationary body (2), in particular in the form of a rotary indexing table. A power drive (40) that can be actuated by a fluid pressure is provided for creating a clamping force effective between the clamping surfaces (24, 26). For forming pairs of clamping surfaces (24, 26) interacting with each other a pack of lamellas lying upon each other is provided, formed from stationary disks (24) connected to the stationary body (2) and from movable disks (26) connected to the movable body (4). The power drive (40) can be used to apply a pressing force to the disks (24, 26) in a clamping area (42).

16 Claims, 4 Drawing Sheets

(56) References Cited

FOREIGN PATENT DOCUMENTS

| | | |
|---|---|---|
| DE | 34 25 258 | 3/1985 |
| DE | 10 2007 013 809 | 10/2007 |
| DE | 10 2006 021 344 | 5/2012 |
| DE | 103 51 694 | 4/2013 |
| DE | 10 2016 215 211 | 2/2018 |
| EP | 0 064 741 | 2/1985 |
| JP | 2003-311590 | 11/2003 |
| JP | 2014-226768 | 12/2014 |

* cited by examiner

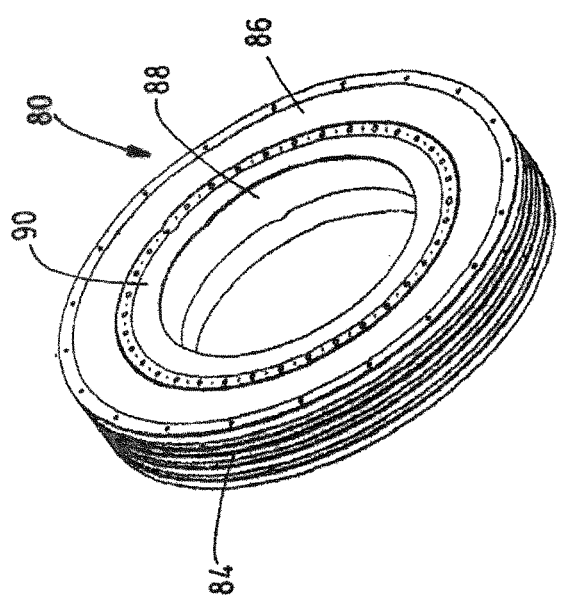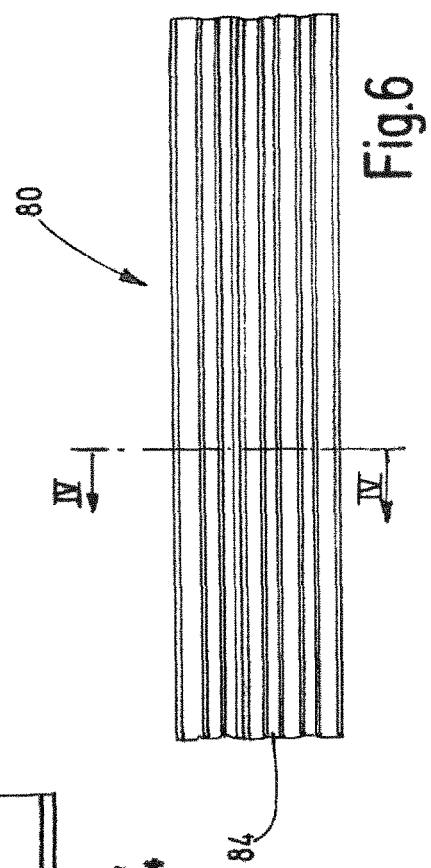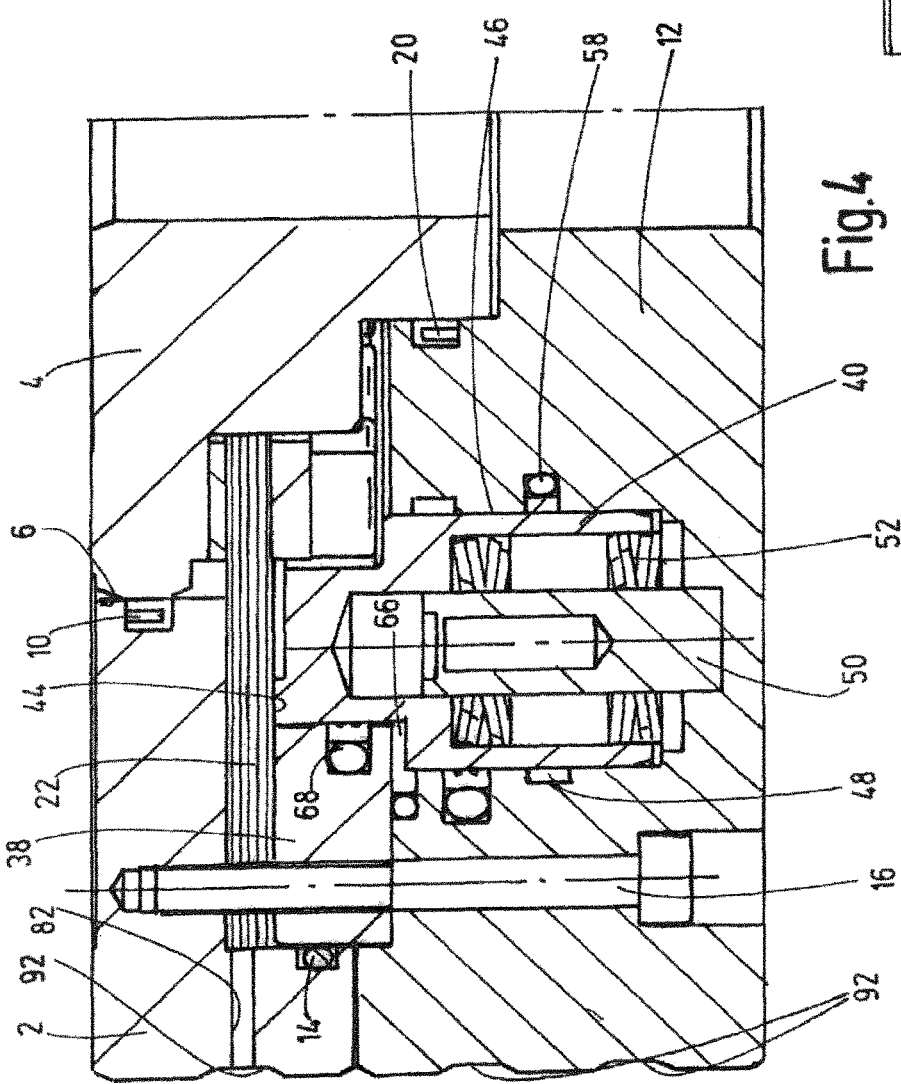

DEVICE FOR CREATING A CLAMPING

FIELD OF THE INVENTION

The invention relates to a device for creating a clamping between clamping surfaces facing each other and forming a frictional engagement between each other, on a stationary body and a body that can be moved relative thereto, in particular in the form of a rotary indexing table. A power drive that can be actuated by a pressure means is provided for creating a clamping force effective between the clamping surfaces.

BACKGROUND OF THE INVENTION

To ensure the exact machining of workpieces arranged on rotary indexing tables, on the one hand, the rotary indexing table has to be positioned with high precision in the appropriate rotary positions. On the other hand, to achieve high machining quality, the rotary indexing table has to be fixed absolutely firmly in the selected rotary positions. As shown in the document DE 103 51 694 B4, it is state of the art to use devices of the genus mentioned at the beginning for this purpose. Those devices by a hydraulically actuated power drive permit a clamping between a stationary and a movable body, such as between a rotary indexing table and a stationary stand. For the known solution, on the movable body a lateral radial groove is introduced to form clamping surfaces. The movable body uses these clamping surfaces formed by the side walls of the radial groove to extend in the manner of clamping tongs over one clamping surface on a stationary control element each, being formed to be bi-partite and having a first and a second control part, which forms the respective clamping surface. This complex construction of the known device requires the precise machining of large surfaces, in particular at the radial groove, forming the movable clamping surfaces, of the movable body. Close tolerances have to be maintained to achieve effective clamping. The two control parts, forming the clamping surfaces, of the bi-partite formed stationary control element can be hydraulically pressed apart to generate the clamping force. For this purpose, in the first control part a pressure chamber is formed, which can be supplied via a conduit running in the other control part. The supply of the pressure media for this purpose from one control part to the pressure chamber located in the other control part also causes sealing issues for the known solution. This renders the implementation of the known solution complex and expensive.

SUMMARY OF THE INVENTION

Based on this state of the art, the invention addresses the problem of providing a device of the genus mentioned above, which ensures a secure clamping and at the same time is characterized by a simple construction that is inexpensive to produce.

According to the invention, this problem is basically solved by a device having, as, an essential feature of the invention, pairs of clamping surfaces interacting with each other of at least one pack of stacked lamellas formed from stationary disks connected to the stationary body and from movable disks connected to the movable body. The power drive can be used to apply a pressing force to the disks in a clamping area. Instead of wall parts being formed continuously in the prior art on the movable body and having a large surface area, the invention provides separate clamping areas, each formed by a lamellar pack. The need for close-tolerance fine machining of large-surface wall parts is eliminated. With larger tolerances permitted between the stationary body and the movable body, the device according to the invention can be produced with reduced effort inexpensively.

In advantageous exemplary embodiments, stationary and movable disks are connected to the assigned body at one attachment point each. The width of the disks measured from their attachment point to the attachment point of the other disks is such that they overlap within the clamping area located between the attachment points.

Preferably, the overlapped clamping area is located centrally between the attachment points.

In advantageous exemplary embodiments, as part of the lamellar pack to the attachment points, a sequence of stationary and movable spacer disks is connected. The spacer disks have the same wall thickness as the overlapping disks, which each being arranged between a pair of overlapping disks connected to the same attachment point and which each terminating at a distance from the clamping area. This layering results in a homogeneous structure of the lamellar pack with plane disks.

If, due to tolerances between the movable body and the stationary body, there is an air gap too large, such an air gap can, if necessary, be reduced or adjusted by arranging in addition to the sequence of movable spacer disks at the attachment point thereof a movable spacer disk of the second type having a selectable wall thickness. The movable spacer disk of the second type rests against a spacer disk of the first type.

Advantageously, the arrangement may be such that the attachment point of the stationary disks and stationary spacer disks is formed by at least one bolt located in the stationary body. The attachment point of the movable disks and movable spacer disks is formed by at least one bolt located in the movable body.

In particularly advantageous exemplary embodiments, the bolt of the stationary attachment point also fixes a device body containing the power drive to the stationary body.

With particular advantage, the arrangement is such that the power drive has a hydraulically actuated piston, which is guided movably in the device body in a direction perpendicular to the plane of the lamellar pack. The end face of the piston can be used to apply a clamping force to the clamping area of the lamellar pack.

In advantageous exemplary embodiments, in the device body are formed a pressure chamber delimited by the piston and a conduit through which a pressurized media can be supplied to the pressure chamber to use the piston to apply a clamping force to the clamping area.

In particularly advantageous exemplary embodiments, in the device body a second pressure chamber delimited by the piston is provided, to which pressure media can be supplied via a second conduit to generate a movement of the piston directed away from the clamping area. In this way, by controlling the power drive control clamping and releasing can be performed each.

As a safety device providing an emergency stop for the movable body in the event of a failure of the hydraulic system, in the device body an energy storage can be provided. The energy storage applies to the piston a force generating a clamping force at the clamping area. In this case, the clamping is released by a movement of the piston against the prestressing force of the energy storage, caused by pressurization of the second pressure chamber.

Advantageously, to form the energy storage disk springs can be provided, which are resting on the piston on the one hand and on the device body on the other hand.

The stationary body, the movable body and the clamping units including their device bodies can be combined to form a clamping cartridge forming an interchangeable unit. This embodiment is easy to maintain, as the complete unit can be replaced. Also, this embodiment is easy to use, as the user can use different clamping cartridges, for instance with or without an emergency stop function based on safety clamping by means of an energy storage, depending on the application.

The rotary seals located in the clamping cartridge can be used to form the seal between the stationary body and the movable body, as well as between the movable body and the device bodies of the clamping units.

For the seal formed in the clamping cartridge in this way, pressurized media channels may be provided extending from the outer circumference of the clamping cartridge to the lamellar packs of the clamping units such that they may be lubricated by the supply of pressurized media, if required.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure:

FIG. 4 is a side view in section taken along line IV-IV of FIG. 6;

FIG. 5 is a perspective view of a clamping cartridge, comprising the clamping units and forming part of a clamping unit according to a second exemplary embodiment of the invention; and FIG. 6 is a side view of the clamping cartridge of FIG. 5.

DETAILED DESCRIPTION OF THE INVENTION

Figure 1:
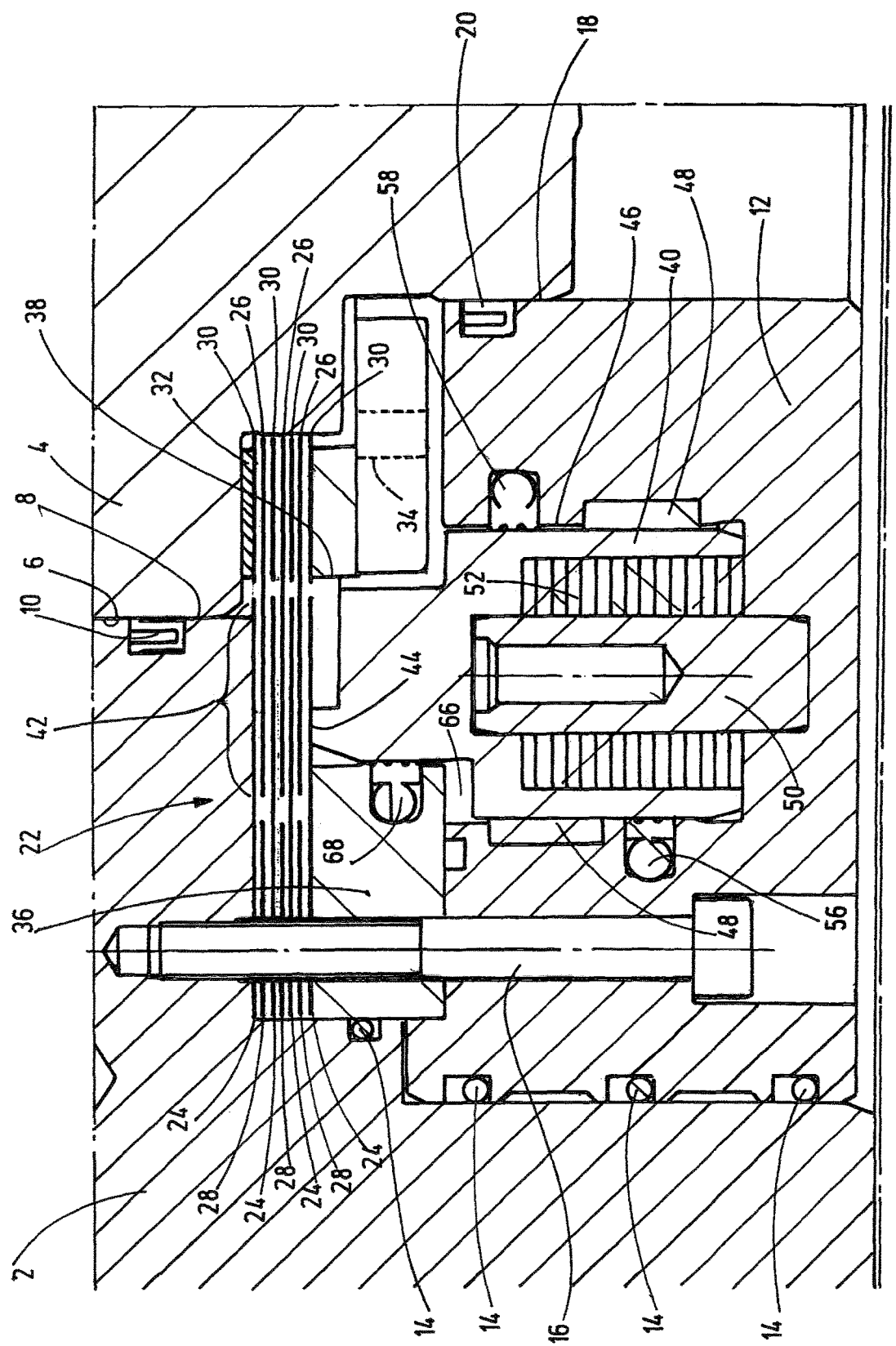
FIG. 1 is a schematically simplified side view in section of a clamping unit according to a first exemplary embodiment of the invention, wherein the disks of a lamellar pack are shown at a vertical distance from each other for clarity.

The invention is explained based on the example of use of the device for fixing the position of rotary indexing tables with reference to the attached drawings. FIGS. 1 to 4 each show a clamping unit according to a first exemplary embodiment of the invention. To create the clamping for fixing the position of a rotary indexing table, which is formed in accordance with the prior art and therefore is not shown in its entirety in the drawing, a plurality of the clamping units, shown in the figures, are arranged at distances from each other along the circumferential area of the rotary indexing table on a base body or stand to fix the rotary position of the rotary indexing table with respect to the stand, which is also not shown in its entirety in the figures. More specifically, in the figures, a stationary body 2 is part of the stand. A cylindrical circumferential surface 6 of a movable body 4, which is connected to the rotary indexing table (not shown in its entirety), can be moved along a facing hollow cylindrical surface 8 of the stationary body 2 during the rotary movement of the table. A sealing element 10 is used to seal the circumferential surface 6 at the hollow cylindrical surface 8.

FIGS. 1 to 4 show, in simplified sectional views and various positions of the sectional planes, one of the clamping units equally formed. The clamping units have a hydraulically actuated power drive for generating a clamping force. The power drive is part of a device body 12, which is firmly connected to the stationary body 2 by bolting. Sealing means or seals 14 are provided on the lateral surface, abutting on the stationary body 2. Only a fastening bolt 16 of the bolt connection of the device body 12 to the stationary body 2 is shown in FIGS. 1 and 4. A seal 20 is used to seal the device body 12 at the side face, located radially inside relative to the axis of rotation of the rotary indexing table (not shown), with respect to an overlapping wall part of the movable body 4. The pairs of clamping surfaces are formed by a lamellar pack 22. The lamellas of the pack 22 have metallic annular disks, lying on top of each other and having the identical wall thicknesses.

Figure 2:
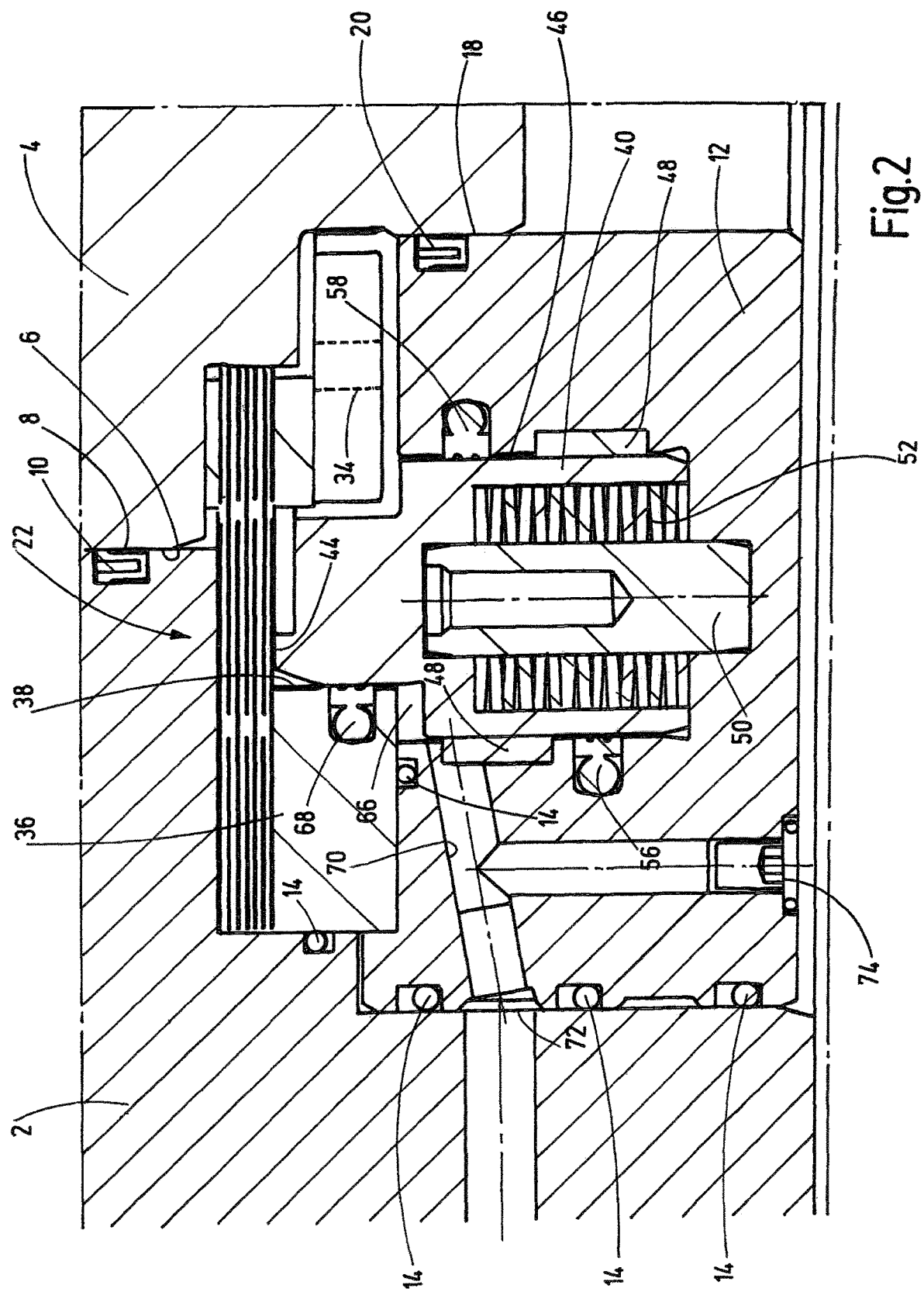
FIG. 2 is a side view in section, wherein the sectional plane is rotated in relation to FIG. 1 of the clamping unit of FIG. 1.
Figure 3:
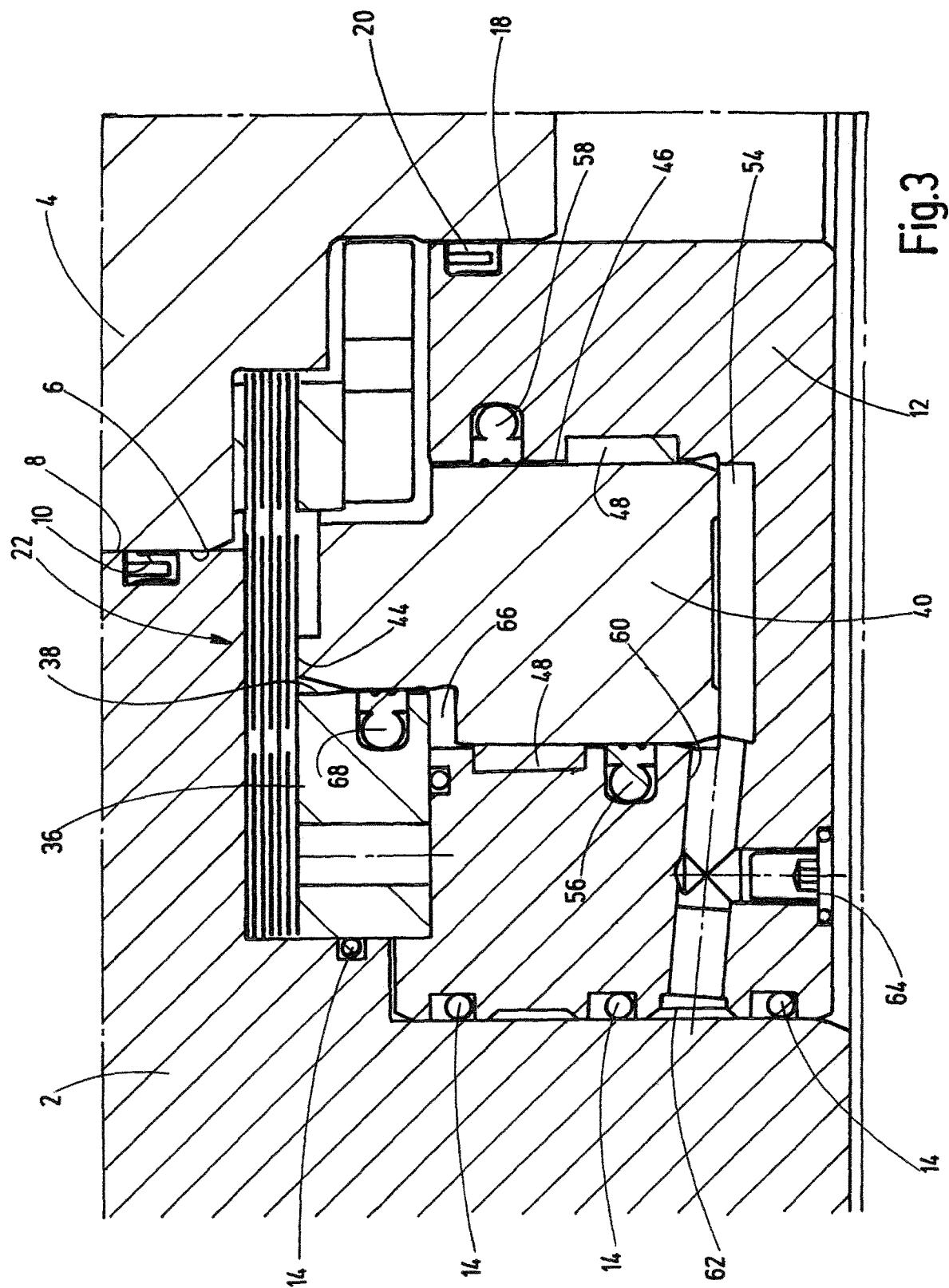
FIG. 3 is a side view in section, wherein the sectional plane is further rotated in relation to FIGS. 1 and 2 of the clamping unit of FIGS. 1 and 2.

However, in FIGS. 1 to 3, to indicate and number the different types of disks in the pack 22, the disks are shown in a position slightly spaced apart from each other. As numerated, these are stationary disks 24, movable disks 26, stationary spacer disks 28, movable spacer disks 30 and a movable spacer disk 32 of second type. The bolts 16 constitute the attachment point of the stationary disks 24 and 28, see FIG. 1. The point of attachment of the movable disks 26, 30 and 32 is formed by bolting to the movable body 4 using bolts 34, of which only the position is indicated in the figures, because they are not visible in the position of the sectional plane. In the radial direction, i.e. viewed from the attachment point on the stationary body 2 (bolt 16) towards the attachment point on the movable body 4 (bolt 34), the width of the stationary disks 24 and that of the movable disks 26, having the same width, is such that they overlap in a clamping area 42 (FIG. 1).

For distinguishing from the spacer disks 30, 32, the disks 24 and 26 are therefore also referred to as overlapping disks. As FIG. 1 shows, the clamping area 42 is located off-center between the connection points. In the pack 22, the disks are layered such that, in sequence, stationary overlapping disks 24 alternate with stationary spacer disks 28 and likewise movable overlapping disks 26 alternate with movable spacer disks 30. The width of the spacer disks 28 and 30, as viewed in the radial direction, is such that they each terminate just short of the clamping area 42. For compensating or adjusting an axial play between the surfaces, which extend in radial planes and face the lamellar pack 22, of the stationary body 2 and of the movable body 4 an additional spacer disk 32 of a second type is provided as a movable disk, connected to the movable body 4. The thickness of this spacer disk 32 of the second type is selected according to the air gap to be compensated and can differ from the wall thickness of the other disks 24, 26, 28, 30, each of which have the same wall thickness.

At the end facing the lamellar pack 22, the device body 12 has an annular body 36, which forms a contact surface for the lamellar pack 22 and whose annular opening 38 is reached through by the end face of a piston 40. A front pressure surface 44 of the piston 40 rests against the clamping area 42 of the lamellar pack 22. The opposite side of lamellar pack 22 is supported in the clamping area 42 on the stationary body 2. To generate a clamping force between the pressure surface 44 and the lamellar pack 22, guide bands 48 are used to displaceably guide the piston 40 for hydraulic actuation in a cylinder 46 in the device body 12. For an additional generation, independent of the hydraulic actuation, of a clamping force, the piston 40 has, starting from its end facing the pressure surface 44, a hollow-cylindrical recess, in which on a guide pin 50 disk springs 52 are arranged, which pretension the piston 40 against the lamellar pack 22.

As can be seen in the position of the sectional plane shown in FIG. 3, for the hydraulic generation of the clamping force a pressure chamber 54, which is sealed by the seals 56 and 58, is formed on the underside of the piston 40. The pressure chamber 54 can be supplied with pressure media via a conduit 60 from a lateral radial groove 62 or from a port 64, which is provided for connecting further components or for supplying media.

In the position of the sectional plane, shown in FIG. 2, the arrangement, provided for releasing the clamping using hydraulic actuation of the piston 40, is shown. As shown, a second pressure chamber 66 is provided at the top of the piston 40, which is sealed by the seal 58 and a further seal 68 located on the annular body 36. This pressure chamber 66 can be supplied with pressure media via a conduit 70 from a lateral radial groove 72, or from a port 74 which, like the port 64, is provided for the further connection of functional components or for the supply of pressure media. By supplying the pressure chamber 66, for releasing the clamping the piston 40 can be moved away from the clamping area 42 (FIG. 1) against the pretensioning force generated by the disk springs 52. In this arrangement, the concerning movable body 4, such as the concerning rotary indexing table, can by the hydraulic actuation of the piston 40 both be fixed by clamping and released. Simultaneously, the preload, generated by the disk springs 52 of the piston 40, produces a clamping force independent of the hydraulic actuation, albeit lower than the clamping force produced hydraulically. That preload provides a safety function, which also provides an emergency holding torque if the hydraulic system fails. If no emergency stop function is required, the disk springs 52 can be omitted. The generation of slight pressure in the pressure chamber 66 then is sufficient to release the clamping and retract the piston 40 from the extended position.

In the exemplary embodiment shown in FIGS. 4 to 6, the construction and the function of the clamping units, as far as the pressure media actuation of the lamellar pack 22 for clamping and releasing as well as the emergency stop function by the disk springs 20 are concerned, matches that of the previous exemplary embodiment. For that reason this construction and function is not discussed in detail. However, in the second exemplary embodiment, the annular stationary body 2, which together with the device bodies 12, attached thereto, of the clamping unit forms the stationary device part, and the movable annular body 4 are combined to form a structural unit in the form of a clamping cartridge 80, which is shown in its entirety in FIGS. 5 and 6. The stationary body 2 forms the outer ring 86, adjoining the outer circumference 84, of the cartridge 80 (FIG. 5). Relative to the outer ring 86, the movable body 4 as the inner ring 88 (FIG. 5) of the cartridge 80 can be rotated. The upper surface 90 of the inner ring 88 forms the rotating interface for the attachment of the objects to be placed thereon during the use of the rotary indexing table. Because the rotary seals 10 and 20 in the clamping cartridge 80 form a seal between the outer ring 86 and the inner ring 88, as well as between the inner ring 88 and the device bodies 12 of the clamping units, the lamellar packs 22 of the clamping units can be lubricated when required by a supply of pressurized fluid via associated channels 82, extending radially inwards from the outer circumference 84 of the cartridge 80. As shown in FIGS. 4 to 6, the outer circumference 84 of the cartridge 80 is corrugated while forming annular grooves 92, extending in radial planes. For the supply of pressure media via the channels 82, these open out into the annular groove 92, located at the top in FIG. 4.

While various embodiments have been chosen to illustrate the invention, it will be understood by those skilled in the art that various changes and modifications can be made therein without departing from the scope of the invention as defined in the claims.

The invention claimed is:

1. A rotary indexing table, comprising:
a stationary body;
a movable body movable relative to the stationary body;
a clamp selectively forming a frictional engagement between the stationary body and the movable body restraining relative movement between the stationary body and the movable body and releasing the frictional engagement for relative movement of the stationary body and the movable body by a pressure force selectively and alternatively applying and releasing the frictional engagement, the clamp including a pack of lamellas upon each other, the pack of lamellas including stationary disks connected to the stationary body and movable disks connected to the movable body;
a power drive applying the pressure force to the stationary and movable disks in a clamping area of the clamp, the power drive being a part of a clamp device body; and
a clamping cartridge formed of the stationary body, the movable body, the pack of lamellas and lamella bodies supporting the stationary disks and the movable disks into an interchangeable and replaceable unit with the stationary body being an outer ring adjoining an outer circumference of the clamping cartridge and with the movable body being an inner ring of the clamping cartridge rotatable relative to the outer ring, an upper surface of the inner ring forming a rotating interface capable of attaching objects during use of the indexing table.

2. A rotary indexing table according to claim 1 wherein the stationary disks and movable disks are connected to the stationary body and the movable body, respectively, at stationary and movable attachment points, respectively; and
the stationary disks and movable disks have widths measured from the respective attachment points thereof such that the stationary disks overlap with the movable disks in the clamping area located between the stationary and movable attachment points.

3. A rotary indexing table according to claim 2 wherein the stationary disks overlap the movable disks in the clamping area located eccentrically between the stationary and movable attachment points.

4. A rotary indexing table according to claim 2 wherein as part of the pack of lamellas attached to the stationary and movable attachment points, first stationary and movable spacer disks are connected and have equal wall thicknesses with the stationary disks and movable disks that overlap with one another, each first movable spacer disk being between a pair of the stationary disks and movable disks that overlap with one another and being connected to the movable attachment point and terminating at a distance from the clamping area.

5. A rotary indexing table according to claim 4 wherein a second movable spacer disk is structurally different from the first movable spacer disks, has a selected wall thickness and rests against one of the first movable spacer disks.

6. A rotary indexing table according to claim 4 wherein
the stationary attachment point comprises a stationary bolt in the stationary body attaching the stationary disks to the stationary body; and
the movable attachment point comprises a movable bolt in the movable body attaching the movable disks to the stationary body.

7. A rotary indexing table according to claim 6 wherein the stationary bolt fixes the clamp device body containing the power drive and the stationary disks to the stationary body.

8. A rotary indexing table according to claim 1 wherein the power drive comprises a piston guided movably in a direction perpendicular to a plane of the pack of lamellas, an end face of the piston applying the pressure force to the clamping area of the pack of lamellas.

9. A rotary indexing table according to claim 8 wherein the clamp device body comprises a clamping pressure chamber therein delimited by the piston and a clamping pressure media conduit connected in fluid communication with the clamping pressure chamber for forcing the piston in a direction toward the clamping area to apply the pressure force.

10. A rotary indexing table according to claim 9 wherein the clamp device body comprises a release pressure chamber therein delimited by the piston and a release pressure media conduit connected in fluid communication with the release pressure chamber for forcing the piston in a direction away from the clamping area to release the pressure force.

11. A rotary indexing table according to claim 10 wherein the clamp device body comprises an energy storage biasing the piston to apply the pressure force on the stationary and movable disks.

12. A rotary indexing table according to claim 11 wherein the energy storage comprises disk springs.

13. A rotary indexing table according to claim 1 wherein
a first rotary seal in the clamping device body forms a seal between the stationary body and the movable body; and
a second rotary seal in the clamping device body forms a seal between the movable body and the clamp device body.

14. A rotary indexing table according to claim 1 wherein pressure media channels extend from the outer circumference of the clamping cartridge to the pack of lamellas.

15. A clamping device, comprising:
a stationary body;
a movable body movable relative to the stationary body;
a clamp selectively forming a frictional engagement between the stationary body and the movable body restraining relative movement between the stationary body and the movable body and releasing the frictional engagement for relative movement of the stationary body and the movable body by a pressure force selectively and alternatively applying and releasing the frictional engagement, the clamp including a pack of lamellas upon each other, the pack of lamellas including stationary disks connected to the stationary body and movable disks connected to the movable body;
a power drive applying the pressure force to the stationary and movable disks in a clamping area of the clamp, the power drive being a part of a clamp device body; and
a bolt fixing the clamp device body and the stationary disks to the stationary body.

16. A clamping device, comprising:
a stationary body;
a movable body movable relative to the stationary body;
a clamp selectively forming a frictional engagement between the stationary body and the movable body restraining relative movement between the stationary body and the movable body and releasing the frictional engagement for relative movement of the stationary body and the movable body by a pressure force selectively and alternatively applying and releasing the frictional engagement, the clamp including a pack of lamellas upon each other, the pack of lamellas including stationary disks connected to the stationary body and movable disks connected to the movable body;
a power drive applying the pressure force to the stationary and movable disks in a clamping area of the clamp, the power drive being a part of a clamp device body; and
a clamping cartridge being an interchangeable unit formed of the stationary body, the movable body, the pack of lamellas and lamella bodies supporting the stationary disks and the movable disks.

* * * * *